UNITED STATES PATENT OFFICE.

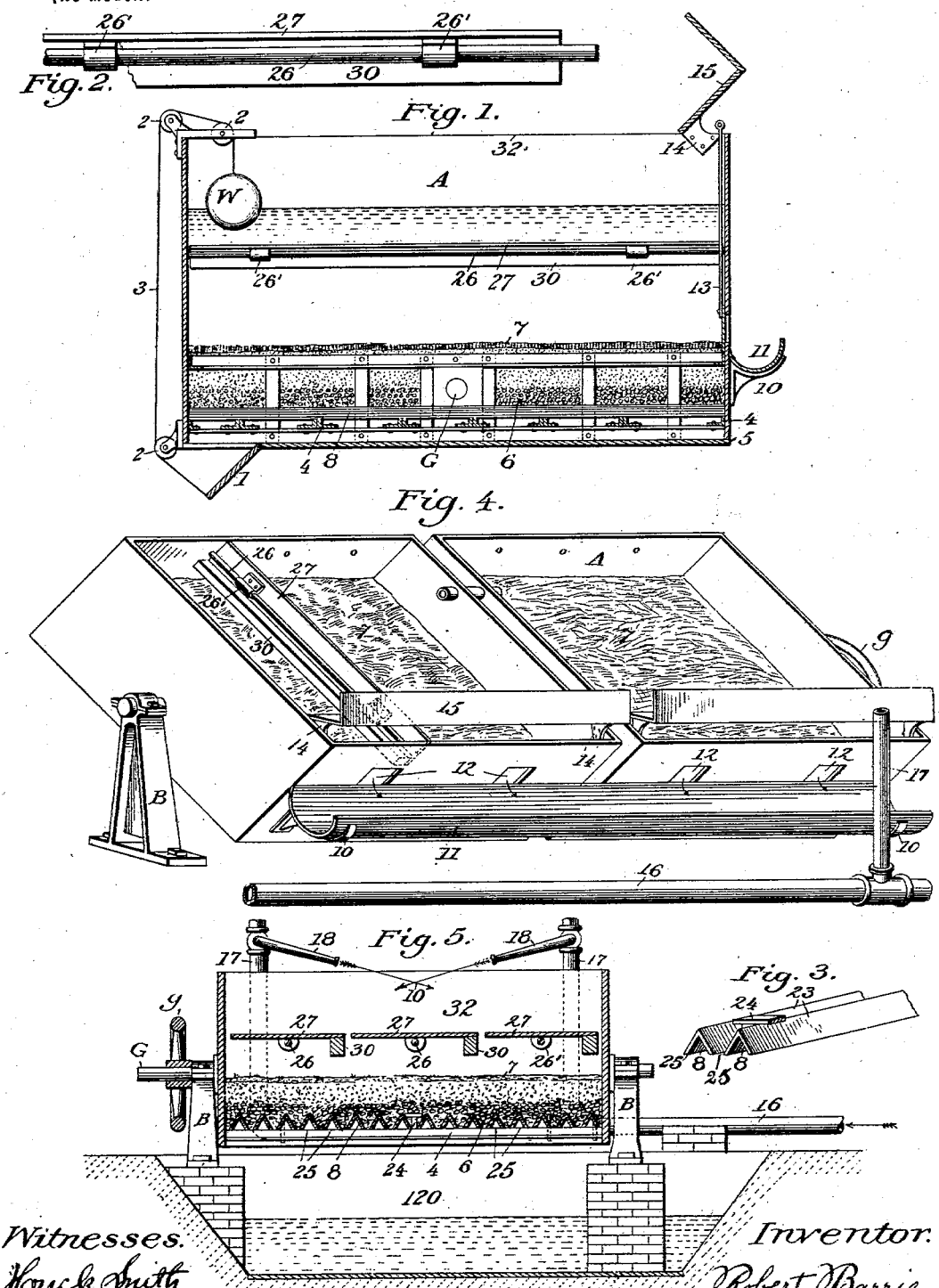

ROBERT BARRIE, OF PHILADELPHIA, PENNSYLVANIA.

WATER-FILTER.

SPECIFICATION forming part of Letters Patent No. 629,310, dated July 18, 1899.

Application filed May 12, 1898. Serial No. 680,526. (No model.)

*To all whom it may concern:*

Be it known that I, ROBERT BARRIE, residing in the city and county of Philadelphia and State of Pennsylvania, have invented a new and useful Improvement in Water Purifying and Filtering Plants, of which the following is a specification.

My invention relates to filtering plants used in purifying water-supplies of cities and towns or in any large quantity for other purposes, if desired.

My invention consists in a prepared turf covering for filter-beds, an automatic submerged floating table that removes settled sediment, sluice-gates, and a waste-water conductor, also a bed-supporting base of inverted angle-iron, mechanical means of tilting or oscillating the filter as a whole, with the required arrangement of feed and delivery pipes, as will hereinafter appear.

Referring to the accompanying drawings, Figure 1 shows a vertical transverse section of tank and bed and the position and connections of gate 1 and weight W. Fig. 2 represents a longitudinal side view of table 27, showing supporting-rod 26, bearing 26', and wooden float 30; Fig. 3, an isometrical view of arrangement of angle-iron 8 and separators 24 and openings 25. Fig. 4 represents an isometrical view of twin filter-beds and shows the general arrangements and positions of the different parts made ready for the cleansing process; Fig. 5, a vertical longitudinal section of a single filter-bed in position over and above a receiving-reservoir, arrows representing conflicting streams of water.

In the construction and application of my invention out of suitable tank metal I construct the four tank sides A. To the bottom edge thereof I secure supporting beams or cross-bars 4. Upon these rest a series of inverted angle-irons 8, kept apart from each other by separators 24. Upon the network thus formed I place a layer of broken stone 6, egg size, next a layer smaller in size, followed by layers of coarse and fine sand. These filtering media I next cover with a thickness of prepared natural turf 7, which has been made free from loose particles by passing the turf through a forced-blast process. This completes the formation of tank and filter-bed, which may be constructed and connected in series of two or more. At the ends thereof I provide supporting central trunnions and bearings G and B, resting upon piers or suitable piers or abutments built within the area of a common reservoir 120, over and above which the filtering-beds are intended to be used. In the water-space within the tank and directly above the turf surface 7 I place a suitable number of self-adjusting floating tables 27, made from tank material, and which swing in bearings 26' upon stay-rods 26, and which are provided with floats 30. Over and above the tanks, extending the length thereof and being made part of the same, I construct a board foot-path 15, resting upon brackets 14. Along and upon the outer side of the tanks I secure an inclined semicircular conductor 11. Through this side of tank I provide sluice openings and gates 12. To the end of shaft or trunnion G, I attach a lever 9, or gear mechanism may be used where needed or desired. Upon either side of the tanks A the feed-pipes 16 are placed horizontally, and from them extend vertically a series of delivery-pipes 17. To the upper end of these pipes are secured exchangeable hose-nozzles, as hereinafter mentioned. When required to control the filter speed, there may be provided a bottom 5, having suitable gate 1, which by means of cord 3 and rollers 2 connects with the floating weight W, controlled by the depth of water within A.

The operation of my invention may be termed a "downward-filtering system," which will be understood to operate as follows: Having connected the feed-pipes 16 to the supply, water under pressure would find exit through guide-nozzles 18. It is these nozzles that guide two or more streams of water in such a manner as to cause said streams to meet and mix at a point above and near the center of each bed. Each stream surrounded by a current of air caused by velocity thereof, being broken or splashed and falling to the bed below, will receive a goodly amount of aeration. The water-space 32 within the tank having been filled, it will be evident that wooden float 30 would bring the table 27 to a horizontal position under water, and thus form a surface to receive settling sediment. The nature of natural turf undoubtedly forms an attractive adhesive surface for slime or river silt, which substance has been found to contain the major portion of all filth, disease-germs, and other impurities. Water passing through turf 7 continues down through layers of sand and rock and striking the surface of inverted angle-iron 8 will trickle down through the openings 25, falling in drops into the reservoir below, thus at this point receiving further aeration thereof. To clean the tables 27 and turf surface 7, power may be applied at 9 and the tank and bed as a whole tilted until the footwalk 15 and conductor 11 reach a horizontal plane. The surface 7 will then be inclined toward the said conductor, when the sluice-gates 12 may be raised. It will be evident that when the water-space 32 is empty the weighted edge of table 27 will cause the same to assume a vertical position. Now an attendant may mount footwalk 15 and exchange guide-nozzle 18 with a common hose and pipe (not shown) and may direct a stream of water upon all parts of inner sides of tank, tables, and surface 7, and thus wash all impurities through 12 into conductor 11, which is intended to deliver the same through proper connections to sewer or other place of deposit. After cleaning the gates 12 are closed, motion reversed at 9, and the tank and bed again brought to a horizontal position and is then ready as before being cleaned.

Having thus described my invention, what I claim as new, and desire to secure by Letters Patent, is—

1. In a water-filtering plant within the inclosing walls of a receiving-tank; a bottom series of lengths of inverted angle-iron and spreading separators therefor, a top-surface layer of prepared natural turf covering the intervening layers of broken stone gravel and sand, a number of submerged, self-adjusting tables for collecting settling sediment, suitable guide-nozzles combined with vertical and horizontal feed-pipes and receiving-reservoir substantially as herein set forth.

2. In a water-filter or filtering plant a combined tank and filter-bed mounted upon suitable trunnions, bearings, abutments or piers thus suspended over and above a supply-receiving reservoir, a series of sluice-gates and operating parts thereof an attached waste-water conductor registering with said gates and leading to some place of deposit an overhanging secured footwalk, combined with a lever or gear tilting mechanism, and vertical and horizontal feed-pipes substantially as herein shown and described.

ROBERT BARRIE.

Witnesses:
HARRY SCHNEEBELE,
RENA SCHNEEBELE.